(No Model.)
LAFAYETTE T. BOW.
VENTILATOR FOR GRAIN, FRUIT, &c.
No. 256,963. Patented Apr. 25, 1882.
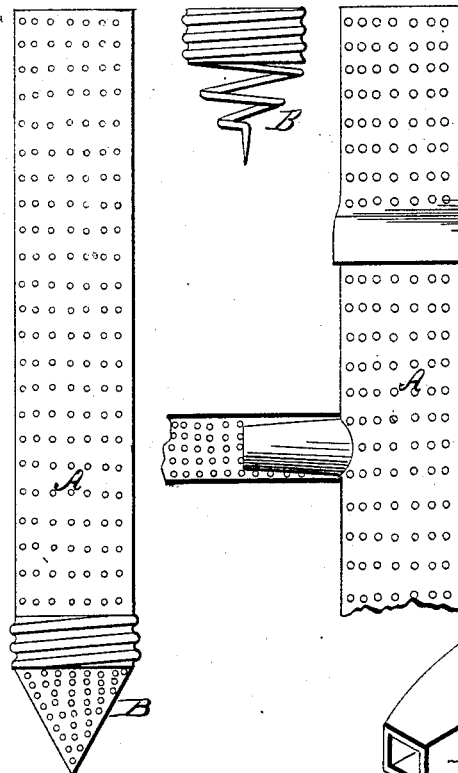
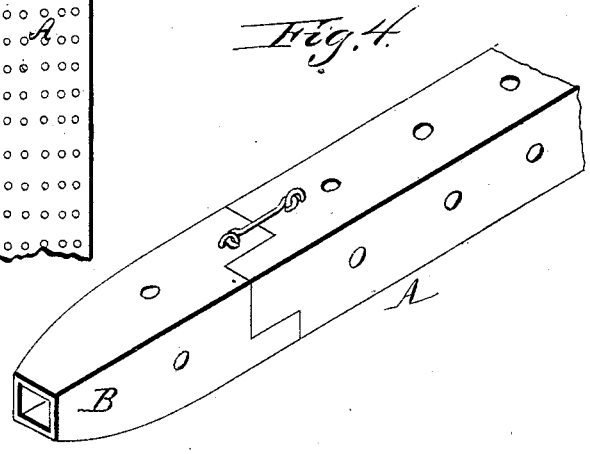
Witnesses:
H. C. McArthur
W. R. Reyworth
Inventor:
L. T. Bow
per
J. W. Alexander
Attorney.
N. PETERS. Photo-Lithographer, Washington, D. C.

UNITED STATES PATENT OFFICE.

LAFAYETTE T. BOW, OF BURKESVILLE, KENTUCKY.

VENTILATOR FOR GRAIN, FRUIT, &c.

SPECIFICATION forming part of Letters Patent No. 256,963, dated April 25, 1882.

Application filed January 21, 1882. (No model.)

*To all whom it may concern:*

Be it known that I, LAFAYETTE T. BOW, of Burkesville, in the county of Cumberland and State of Kentucky, have invented certain new and useful Improvements in Ventilators for Grain, Fruit, &c.; and I do hereby declare that the following is a full, clear, and exact description thereof, reference being had to the accompanying drawings, and to the letters of reference marked thereon, which form part of this specification.

This invention has for its object the ventilation of hay-mows, grain-bins, or receptacles for cereals of various kinds for the purpose of preventing heating and decomposition.

The nature of my invention consists in a perforated or reticulated tube or ventilator having a penetrating point and composed of one or more sections with suitable couplings for the sections, as will be hereinafter explained.

Figure 1 is a short section of a perforated pipe having a removable perforated point connected by a screw to it. Fig. 2 is a spiral wire point having a screw-thread coupling adapted for attachment to the perforated pipe of Fig. 1. Fig. 3 shows detachable sections of the said perforated pipe. Fig. 4 shows a rectangular perforated pipe having a detachable penetrating-point.

The following is a description of my invention:

A designates a tube, which is provided with a conical point, B; or, instead of this conical point, a spiral screw may be substituted. The conical point B may be perforated, or it may be solid. The tube A is thickly perforated for the purpose of allowing a free ventilation or circulation of air through its wall.

The cone-point represented by Fig. 1 is designed for ventilating tubes which are useful for wheat and other grains in bulk.

For hay-mows and straw-stacks I prefer to use on the end of the perforated tube a spiral screw, as illustrated in Fig. 2, by means of which the said tube can be introduced by giving to it a rotary movement.

If desired, the tube can be lengthened by means of sections of perforated tubes. I show in Figs. 1, 3, and 4 several different kinds of couplings.

I may use tubes made of wood which are rectangular in cross-section, coupled together in sections or lengths by means of interlocking joints held in place by hooks or other equivalent fastenings. These tubes I shall perforate, as illustrated in Fig. 4.

Having thus fully described my invention, I claim as new—

1. In a ventilator for grain, hay, &c., the combination of a perforated pipe, the detachable conical penetrating-point, and a screw-coupling, or its equivalent therefor, substantially as described.

2. The combination of the spiral penetrating-point, the screw-thread coupling, and a ventilating-tube which is thickly perforated and to which said point is removably secured, substantially in the manner and for the purpose described.

In testimony that I claim the foregoing as my own I affix my signature in presence of two witnesses.

LAFAYETTE T. BOW.

Witnesses:
N. B. CHEATHAM,
J. T. CHEATHAM.